United States Patent [19]

Asano et al.

[11] Patent Number: 4,907,257
[45] Date of Patent: Mar. 6, 1990

[54] PUBLIC TELEPHONE SET

[75] Inventors: Hiroyuki Asano; Kazuo Asada, both of Tokyo, Japan

[73] Assignee: Tamura Electric Works, Ltd., Tokyo, Japan

[21] Appl. No.: 378,847

[22] Filed: Jul. 12, 1989

[30] Foreign Application Priority Data

Jul. 18, 1988 [JP] Japan ................. 63-177117

[51] Int. Cl.⁴ .......................................... H01M 11/00
[52] U.S. Cl. ..................... 379/144; 379/91; 235/480; 235/380
[58] Field of Search ............. 379/144, 91, 58; 235/380, 379, 480; 381/42

[56] References Cited

U.S. PATENT DOCUMENTS

| | | | |
|---|---|---|---|
| 4,023,205 | 5/1977 | Warner | 235/480 |
| 4,579,228 | 4/1986 | Case | 209/563 |
| 4,613,747 | 9/1986 | McCarthy | 235/480 |
| 4,672,661 | 6/1987 | Clark, Jr. et al. | 379/144 |
| 4,747,569 | 2/1988 | Kutrieb et al. | 379/58 |
| 4,750,201 | 6/1988 | Hodgson et al. | 379/144 |
| 4,757,186 | 7/1988 | Hebeble | 235/380 |
| 4,788,420 | 11/1988 | Chang et al. | 235/483 |
| 4,802,218 | 1/1989 | Wright et al. | 380/28 |
| 4,810,862 | 3/1989 | Nakano et al. | 235/380 |
| 4,811,387 | 3/1989 | Hollowed et al. | 379/144 |
| 4,820,909 | 4/1989 | Kawauchi et al. | 235/379 |
| 4,827,425 | 5/1989 | Linden | 364/478 |
| 4,837,814 | 6/1989 | Yoshino et al. | 379/144 |

Primary Examiner—Robert Lev
Attorney, Agent, or Firm—Remy J. VanOphem

[57] ABSTRACT

A public telephone set includes a card controller for reading information recorded in a card and performing conveyance and data processing of the card on the basis of the read information, and a speech controller for performing speech control corresponding to types of cards on the basis of data from the card controller. The card controller includes a card guide port, connected to a first convey path, for receiving plural types of cards and dispensing only a specific type of card, a return port, connected to a second convey path, for dispensing only remaining types of cards which are not dispensed to the card guide port, and a card selector mechanism for switching the cards into the first and second convey paths on the basis of a property inherent to the types of cards inserted into the card guide port, whereby charging processing corresponding to different types of cards is performed.

10 Claims, 6 Drawing Sheets

PUBLIC TELEPHONE SET

BACKGROUND OF THE INVENTION

The present invention relates to a public telephone set in which various cards can be used and a centralized management system.

Various types of card such as a credit card and a card in which information of a prepaid value is recorded (to be referred to as a prepaid card hereinafter) are used in conventional public telephone sets. These cards comply with the following standards.

The cards are classified into the following three types:
(1) JIS cards such as a cash card and a credit
(2) IC cards (with or without a magnetic stripe); and
(3) prepaid (or debit cards).

When materials, thicknesses, and elastic forces (bending rigidity) of the above types of card are compared, the cards (1) and (2) are made of hard vinyl chloride and have thicknesses of about 0.7 to 0.8 mm, while the card (3) is made of PET (polyethylene telephthalate) resin and has a thickness of about 0.2 to 0.3 mm. The card (3) generally has a lower elastic force than those of the cards (1) and (2).

Although various cards used in the conventional public telephone sets are available as described above, a conventional card processing apparatus for reading out information from a card or writing it therein is designed for only one type of card.

For this reason, in order to use these various types of cards, processing apparatuses corresponding to the number of types of cards must be arranged inside each public telephone set, and its internal structure is complicated. The telephone set itself becomes bulky.

A method of charging fees of a public telephone set capable of accepting a credit card among public telephone sets capable of using various types of cards is preferably practiced by a centralized management system based on a leased on-line network between public telephone companies and credit companies since speech data of a user must be confirmed.

In addition, since there are invalid cards due to unpaid charges or missing cards, the public telephone set capable of accepting a credit card must determine whether a currently used credit card is a valid or invalid card prior to the start of speech.

A typical conventional means for determining validity of the card is to access a credit company center at the time of calling at a public telephone set and to collate whether credit information of the currently used credit card is invalid.

In a centralized management system which confirms speech data and collates the validity of the card by using the leased on-line network, various agreements of use of the on-line network and facility investment are required to create the on-line network. For this reason, a long preparation period and a large amount of capital are required to introduce public telephone sets capable of accepting credit cards.

A conventional system which performs the above confirmation and collation and uses a public telephone network in place of a leased on-line network is disclosed in U.S. Pat. No. 4,750,201. Speech data is output for every call as described above, incurring extra line charging usage. At the same time, disputes which result from shares of the line charging usage occur among a user, a credit card company, and a telephone company.

The conventional centralized management system must check validity of the card, and a relatively long period of time is required to allow a user to speak to a callee, resulting in poor service to the user and degradation of line utilization efficiency.

SUMMARY OF THE INVENTION

It is, therefore, a principal object of the present invention to provide a public telephone set which has a simple, compact internal structure and allows use of various types of cards.

It is another object of the present invention to provide a centralized management system for a public telephone set which can use a public telephone line by only charging usage associated with speech and can offer better service to users.

In order to achieve the above objects of the present invention, there is provided a public telephone set having card control means for reading information recorded in a card and performing conveyance and data processing of the card on the basis of the read information, and speech control means for performing speech control corresponding to types of cards on the basis of data from the card control means, characterized in that the card control means includes a card guide port, connected to a first convey path, for receiving plural types of cards and dispensing only a specific type of card, a return port, connected to a second convey path, for dispensing only remaining types of cards which are not dispensed to the card guide port, and card selecting means for switching the cards into the first and second convey paths on the basis of properties inherent to the type of card inserted into the card guide port, whereby charging processing corresponding to different types of cards is performed.

DETAILED DESCRIPTION OF THE PREFERRED EMBODIMENT

Figure 1:
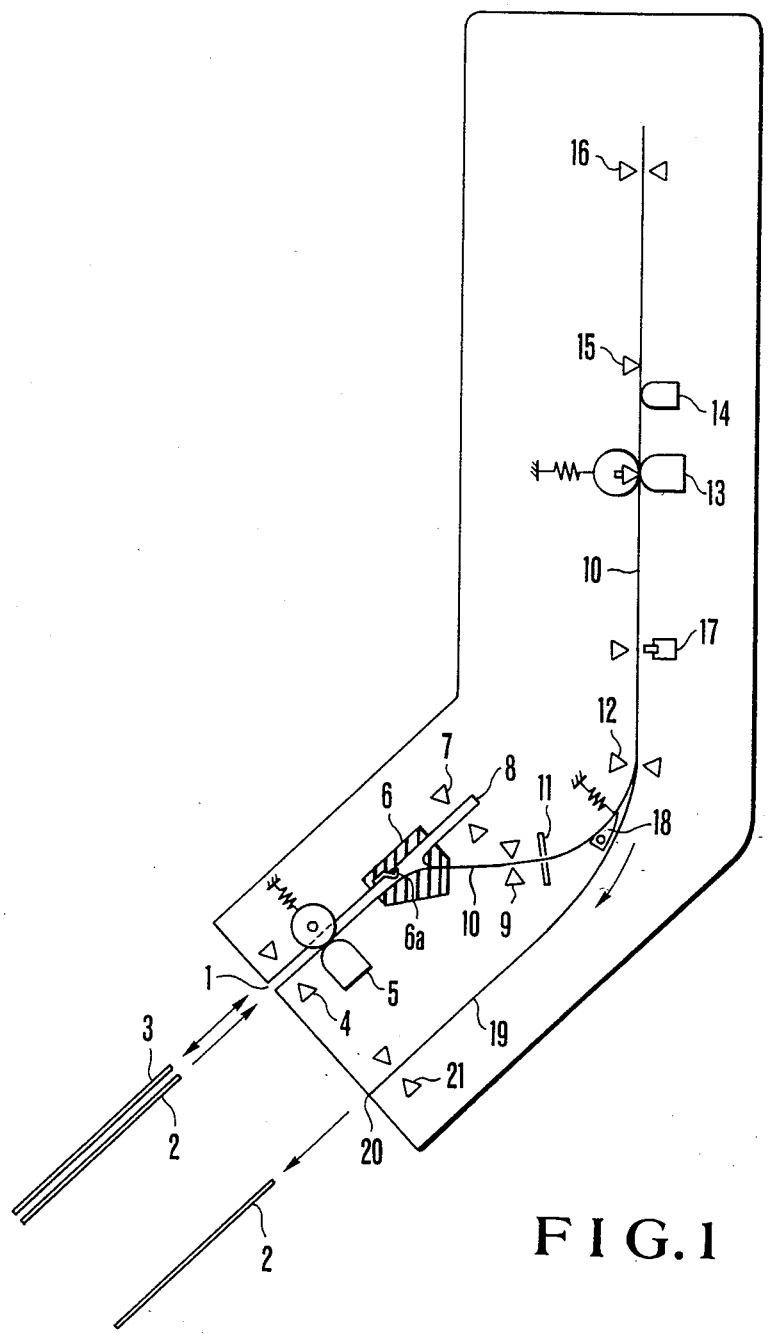
FIG. 1 is a schematic view showing an arrangement of a card reader according to an embodiment of the present invention.

FIG. 1 shows a card reader used in a public telephone set. Referring to FIG. 1, reference numeral 1 denotes a card slot (card guide port) for receiving a prepaid card 2 or receiving/dispensing a credit card 3. Reference numeral 4 denotes a sensor for detecting the inserted card; 5, a read head for reading information recorded on the inserted credit card 3; and 6, a card selector mechanism (card selecting means) for selecting one of the two types of cards in accordance with their thicknesses and elastic forces. The card selector mechanism 6 is proposed in Japanese Patent Application No. 63-22108 filed by the present applicant. A card convey path can be changed by a simple structure utilizing an elastic force of a card itself when the card is urged by a card guide member 6a upon insertion of the card.

Reference numeral 7 denotes a sensor for detecting a leading end of the credit card 3 guided to a first convey path 8 by the card selector mechanism 6. The credit card 3 has a large thickness and a large elastic force. Reference numeral 9 denotes a sensor for detecting the prepaid card 2 guided to a second convey path 10 by the card selector mechanism 6. The prepaid card 2 has a small thickness and a small elastic force. Reference numeral 11 denotes a shutter for preventing entrance of dust, the next card, and the like. Reference numeral 12 denotes a sensor for detecting that the prepaid card 2 has passed through the shutter 11 and is guided to the inside. Reference numerals 13 and 14 denote read/write heads for reading information recorded in the prepaid card 2 and writing information in this card. Reference numeral 15 denotes a sensor for detecting read and write positions of the heads 13 and 14. Reference numeral 16 denotes a sensor for detecting that the prepaid card 2 moved to the deep portion of the convey path 10 when the remaining call count becomes zero. Reference numeral 17 denotes a punch for forming a visual hole in the prepaid card 2 in accordance with a call fee when the prepaid card 2 is moved backward along the convey path 10 upon completion of speech. Reference numeral 18 denotes a convey path selector for switching the path of the card returning along the second convey path 10 into a third convey path 19. Reference numeral 20 denotes a card return port to which only the prepaid card 2 is dispensed; and 21, a sensor for detecting that the prepaid card 2 partially extending from the card return port 20 is removed.

Figure 2:
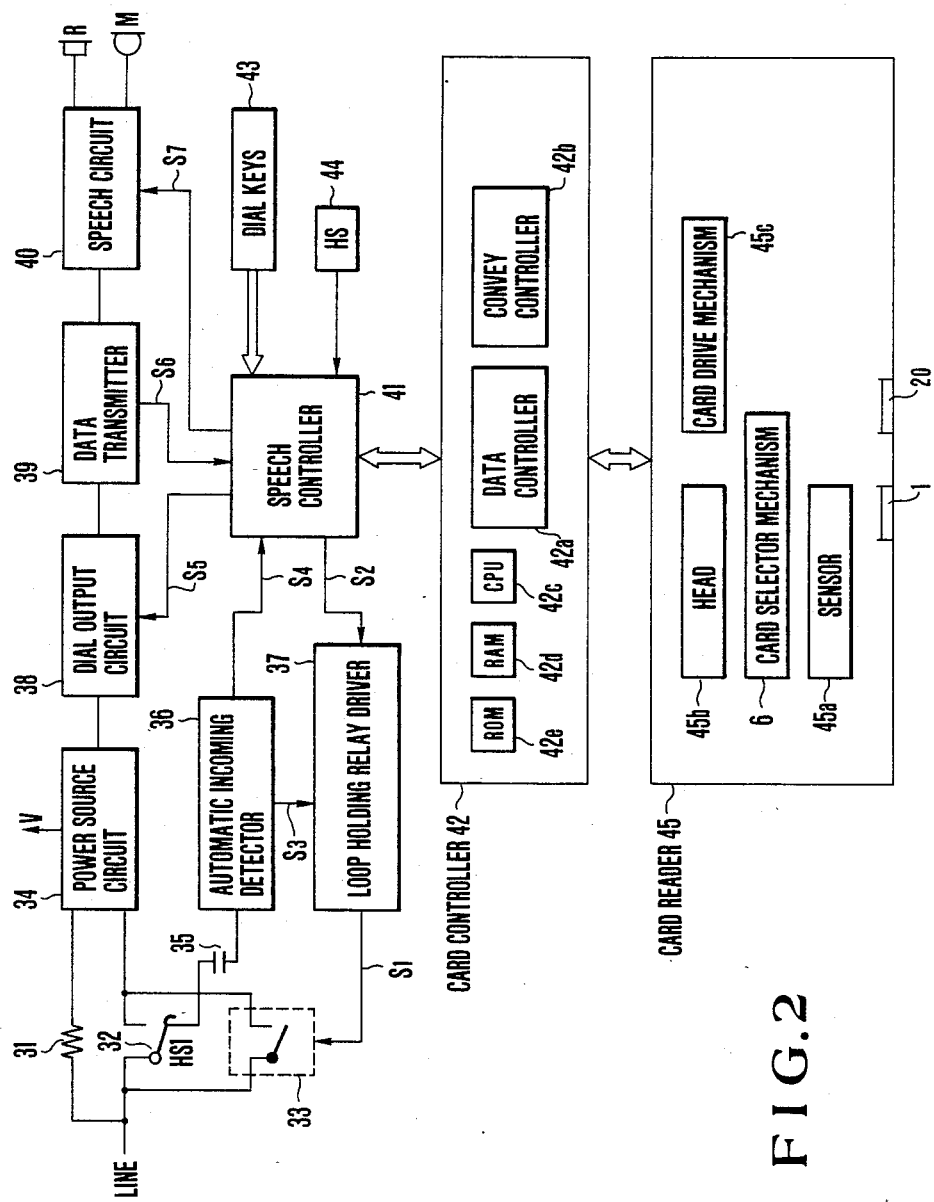
FIG. 2 is a block diagram of a public telephone set of the present invention.

The above components are controlled by a card controller 42 shown in FIG. 2. The card controller 42 includes a data controller 42a, a convey controller 42b, a CPU 42c, a RAM 42d, and a ROM 42e. The data controller 42a checks the digits of data read by a card reader 45 and sends the read data to a speech controller 41. The data controller 42a controls to write, in a prepaid card, data representing a paid amount and supplied from the speech controller 41. The speech controller 41 stores the remaining call count from the prepaid card and adjusts the balance in accordance with charging information. At the same time, the speech controller 41 checks if the credit card and the prepaid card are illegal. The speech controller 41 controls transmission/reception of speech and non-speech signals to/from the public telephone line. The speech signal represents speech, and the non-speech signal represents data communication such as card collation between the telephone set and a credit center or a data terminal attached to an exchange through a modem. The telephone set includes a switching circuit (not shown) for switching transmission/reception of speech and non-speech signals to/from the public telephone line.

In the card reader 45, various sensors shown in FIG. 1 are represented by a sensor 45a, and various heads are represented by a head 45b. Although not shown in FIG. 1, the card reader 45 includes a card drive mechanism 45c for conveying the inserted card. When the sensor 45a detects insertion of the card, information from the sensor 45a is transmitted to the card controller 42. The card drive mechanism 45c is driven by the convey controller 42b, and the card is conveyed.

Referring to FIG. 2, reference numeral 31 denotes a charge current limiting resistor; 32, a hook switch; 33, a loop holding relay; 34, a power source circuit for supplying power to each block; 35, a capacitor; 36, an automatic incoming detector for detecting an incoming signal; 37, a loop holding relay driver; 38, a dial output circuit; 39, a data transmitter/receiver; 40, a speech circuit; 41, the speech controller which incorporates a ROM and a RAM; and 43, dial keys.

Reference symbols S1 and S2 denote loop holding relay set and reset signals; S3, a loop holding relay set signal; S4, an incoming signal; S5, a dial signal; S6, a data signal; S7, a mute signal; R, a receiver; M, a transmitter; and V, an output voltage from the power source circuit 4.

Figure 3:
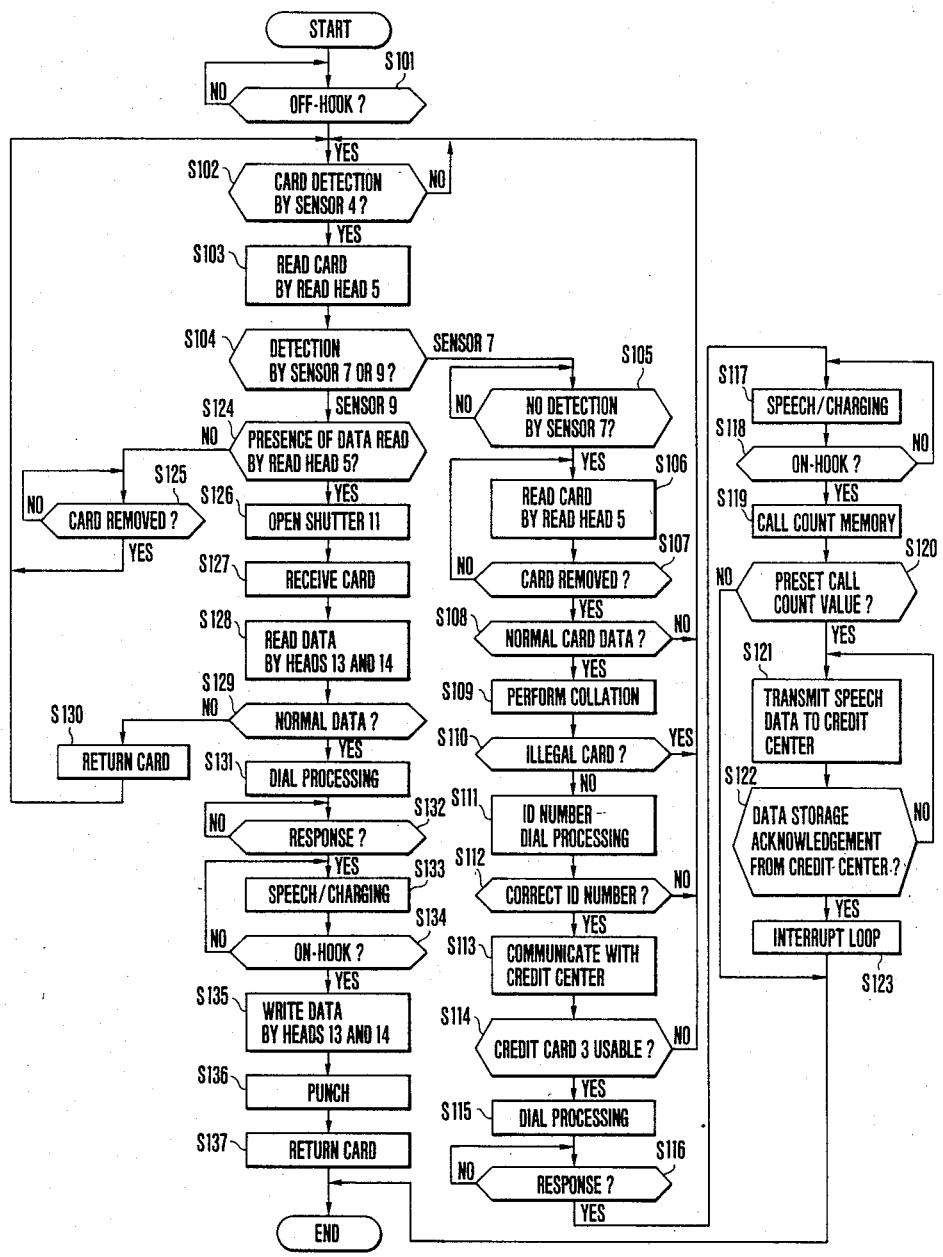
FIG. 3 is a flow chart for explaining an operation of the public telephone set shown in FIG. 2.

An operation of the telephone set having the above arrangement will be described with reference to a flow chart in FIG. 3. The flow chart shows control processing of the CPU 42c.

The CPU 42c determines in step 101 whether the telephone set is set in an off-hook state. If YES in step 101, the CPU 42c causes the sensor 4 to detect whether the card is inserted from the card slot 1 (step 102). If YES in step 102, information recorded in the inserted card is read by the head 5 (step 103). The CPU 42c then determines in step 104 whether the card is detected by the sensor 7 or 9.

When the card is detected by the sensor 7, the inserted card is determined to be the credit card 3 by the card controller 42. If no detection signal is output from the sensor 7, the CPU 42c determines whether the credit card 3 is removed (step 105) when no detection signal is output from the sensor 7, and the information recorded in the credit card 3 is read by the read head 5 during removal of the credit card 3 (step 106). The CPU 42c then determines in step 107 whether the credit card 3 is removed.

If YES in step 107, the CPU 42c determines electrical items such that the number of digits of the read card data is normal (step 108). If YES in step 108, the read card data is collated with illegal card information (e.g., stolen card information and invalid information) (step 109). Therefore, the CPU 42c determines in step 110 whether the credit card 3 is illegal. If the credit card 3 is determined to be a legal card, a message is output to guide the caller to input an ID number as individual identification information. The caller dials the ID number, and ID number dial processing is performed (step 111). The CPU 42c determines in step 112 whether the processed ID number is normal. If YES in step 112, the telephone set communicates with the credit center (step 113) to determine whether the inserted credit card 3 is usable (step 114). If YES in step 114, the user is instructed to input a callee's telephone number. The caller dials the callee's telephone number, and therefore dial processing is performed (step 115).

The contents of processing in steps 113 and 114 vary depending on the scale of the system which employs the public telephone set. In a large system, whether the credit card can be used or not is determined by processing shown in steps 113 and 114 or communication processing between the large system and a data terminal having the same processing function as the credit center. In a medium system, the same processing as that in the data terminal is similarly performed in the public telephone set to determine whether the credit card can be used or not.

The CPU 42c determines in step 116 whether the callee responds. Upon response of the callee, a speech loop is formed between the caller and the callee. At the same time, charging processing corresponding to speech can be performed (step 117). The CPU 42c determines in step 118 whether the telephone set is set in the on-hook state. If YES in step 118, speech data such as a call date and a call time of a credit number are written in a call count memory area of the RAM 42d (step 119). The input call count value is compared with a preset call count value as a maximum memory capacity (metering parameters) of the call count memory area (step 120). If the input call count value is smaller than the preset call count value, processing is ended. Otherwise, the capacity of the call count memory is determined to be full. The speech data is transmitted to the credit center (step 121). The CPU 42c determines whether the data storage acknowledgement signal from the credit center is received (step 122). When this signal is confirmed, the loop is interrupted, and speech is ended (step 123).

Communication processing between the telephone set and the credit center in steps 121 and 122 is executed in accordance with the size of a system which employs the public telephone set in the same manner as described above.

When the sensor 9 detects the card in step 104, the card controller 42 determines that the inserted card is the prepaid card 2. The CPU 42c determines in step 124 whether data read by the read head 5 in step 103 is present. When the read data is not present, the CPU 42c determines whether the card is removed (step 125). If YES in step 125, the flow returns to step 102, and the above operations are repeated.

When the read data is present, i.e., if YES in step 124, the shutter 11 is opened (step 126) to guide the prepaid card 2 along the second convey path 10 (step 127). The guided prepaid card 2 is conveyed to the positions of the read and write heads 13 and 14 under the control of the card controller 42. Information recorded in the prepaid card 2 is read by the heads 13 and 14 (step 128).

The CPU 42c determines in step 129 whether the read data is normal. If NO in step 129, the inserted card is returned to the card return port 20 through the third convey path 19 (step 130). When the read information is determined to be normal, the read data is stored in the speech controller as remaining call count data to instruct the caller to input a callee's telephone number. The caller dials the callee's telephone number, and dial processing is performed to call the designation (step 131).

The CPU 42c determines in step 132 whether the callee responds. If YES in step 132, speech is performed and the remaining call count value stored in the speech controller is balanced by charging data, thereby charging a call fee to the caller (step 133). The CPU 42c determines in step 134 whether the telephone set is set in the on-hook state. If YES in step 134, the information stored in the prepaid card 2 is read out and the recorded data is updated by the current call (step 135). Subsequently, a hole is formed in the prepaid card 2 by the punch 17 (step 136). The prepaid card 2 is transferred to the third convey path 19 and is returned to the card return port 20 (step 137).

The card selector mechanism 6 need not mechanically select the card by utilizing an elastic force of the card itself. Alternatively, the card selector mechanism 6 may electrically control a selector member upon data reading of the credit card by the read head 5, or may include a thickness detecting means to electrically select the card as in Japanese Pat. Application No. 63-22109.

In this embodiment, the control processing of the CPU 42c has been exemplified. However, a CPU, a RAM, and a ROM may be arranged in the card reader 45 to share control processing of the CPU 42c.

The telephone set according to this embodiment includes the card reader having a card selecting means for switching a card to a specific convey path on the basis of the thicknesses of the two types of card inserted from the card slot; the data from the card controller for performing convey control for conveying the card inserted from the card slot to each card return port and data processing of the card; and the speech controller for performing speech control for the type of card on the basis of the data from the card controller. Therefore, the internal structure of the telephone set need not be complicated, and the telephone set as a whole need not be bulky. Various types of cards can be used in one public telephone set, thus offering better service to users.

Figure 4:
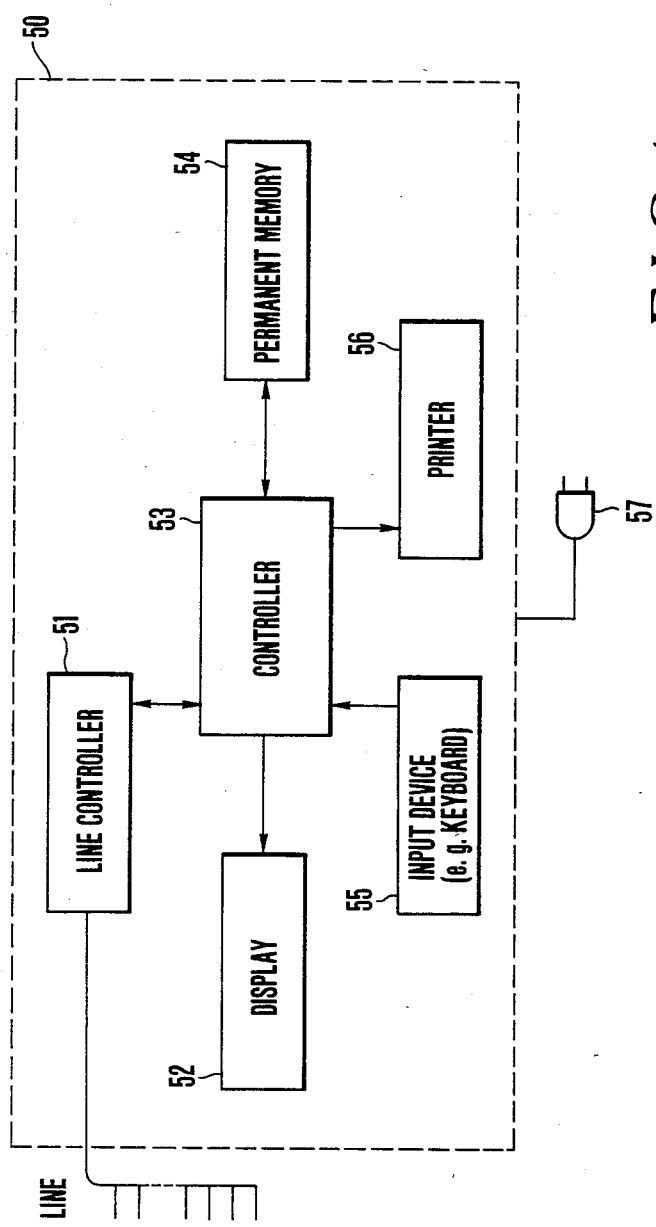
FIG. 4 is a block diagram showing a centralized management system according to the present invention.

FIG. 4 is a centralized management apparatus connected to the public telephone set shown in FIG. 2 and a plurality of other public telephone sets. Reference numeral 50 denotes a centralized management apparatus installed in the credit center. This centralized management apparatus is connected to a plurality of public telephone sets through a telephone line.. Reference numeral 57 denotes a commercial power input unit.

The centralized management apparatus 50 has a line controller 51, a display 52, a controller 53 incorporating a buffer memory, a permanent memory 54, an input device (e.g., a keyboard) 55, and a printer 56.

An operation of the centralized management apparatus having the above arrangement will be described below. The centralized management apparatus shown in FIG. 4 causes speech data (metering parameters) from the public telephone set described in step 121 of FIG. 3 to store in a buffer memory. When a call fee calculation is required, it is calculated for every call in accordance with a predetermined fee calculating method and transfers the calculated result to the permanent memory 54 in units of credit card numbers (to be referred to as credit Nos. hereinafter). This operation is performed every time the speech data is received from the public telephone set.

The centralized management apparatus automatically calculates credit Nos. and total amounts of fees within an arbitrarily predetermined period (e.g., 30th day of every month) and prints bills in a predetermined format (bill issuing means). The predetermined format is based on speech data, and various preset printing data are selected.

The bills printed by the centralized management apparatus are utilized as bills to credit companies when the credit cards issued by these credit companies are used to make calls. If credit cards issued by telephone companies are used to make calls, the bills are utilized directly for the users.

When retrieval and display conditions are input from the input device 55, the centralized management apparatus 50 retrieves and classifies data of the predetermined previous period and displays the retrieved and classified data. Therefore, the public telephone companies can manage the utilization conditions of public telephone sets to suitably plan moving and additional installation of telephone sets.

Figure 5:
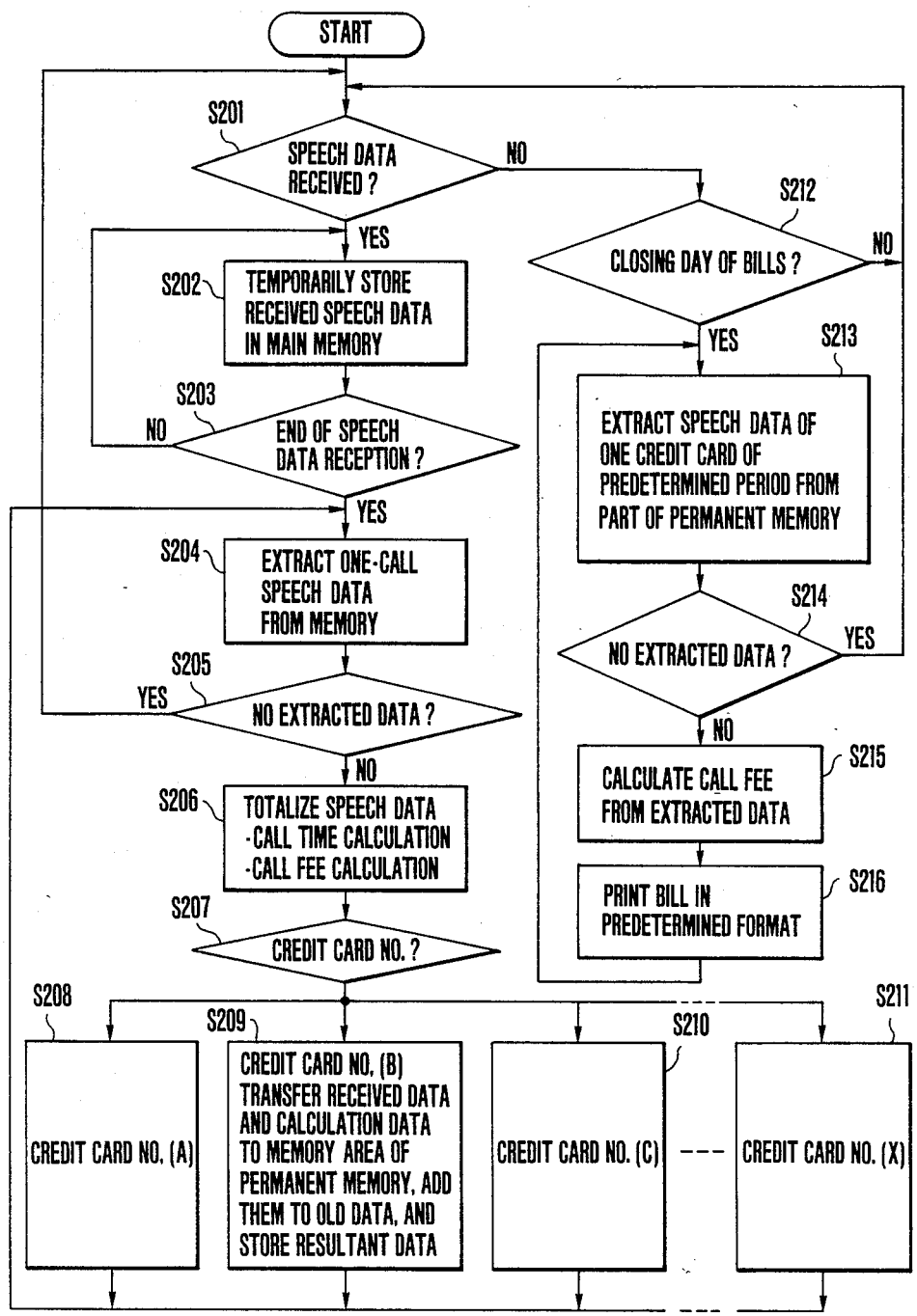
FIG. 5 is a flow chart showing an operation of the centralized management system shown in FIG. 4.

FIG. 5 is a flow chart showing an operation of the centralized management apparatus 50 shown in FIG. 4.

The operation will be described with reference to FIG. 5.

When an operation is started, the controller 53 determines whether speech data is received from a public telephone set (step S201). If YES in step S201, the speech data is temporarily stored in a buffer memory incorporated in the controller 53 through the line controller 51 (step S202). The controller 53 determines whether all speech data are received (step S203) and extracts one-call speech data from the buffer memory upon reception of all the speech data (step S204). If the extracted data is present (step S205), speech data calculations such as call time and fees are performed (step S206). However, if the extracted data is not present, i.e., if NO in step S206, the flow returns to step S201. After the determination in step S206 is completed, the controller 53 checks a credit card No. (step S207) If the controller 53 determines that this credit card No. is a credit card No. (B), the reception data and calculation data are added to the old data in a memory area of the credit card No. (B) in the permanent memory (step S209). The same operations as described above are performed in steps S208, S210, and S211 upon determination of the credit card Nos.

If speech data reception is not determined in step S201, the controller 53 determines whether the current date represents a closing day of bills (step S212). If NO in step S212, the flow returns to step S201. If YES in step S212, speech data of each credit card within a predetermined period are extracted from part of the permanent memory (step S213). The controller 53 determines whether the extracted data are present (step S214). If there are extracted data, i.e., if YES in step S214, call fees are calculated on the basis of the extracted data (step S215). However, if there is no extracted data in step S214, the flow returns to step S201. Thereafter, a bill is printed in the predetermined format (step S216), and the flow returns to step S213.

In a credit company or its department of management, if invalid credit card Nos. (to be referred to as invalid credit Nos. hereinafter) caused by unpaid charges and card missing are already known, the invalid credit Nos. can be input to the input device 55 of the centralized management apparatus. Therefore, the centralized management apparatus 50 automatically and sequentially calls the public telephone sets and sends the invalid credit Nos. thereto (transmitting means). Invalid credit Nos. can be added to a memory area of the RAM 42d of each public telephone set in accordance with a predetermined signal reception sequence. The invalid credit card data can be deleted by the same method as described above (receiving means).

Figure 6:
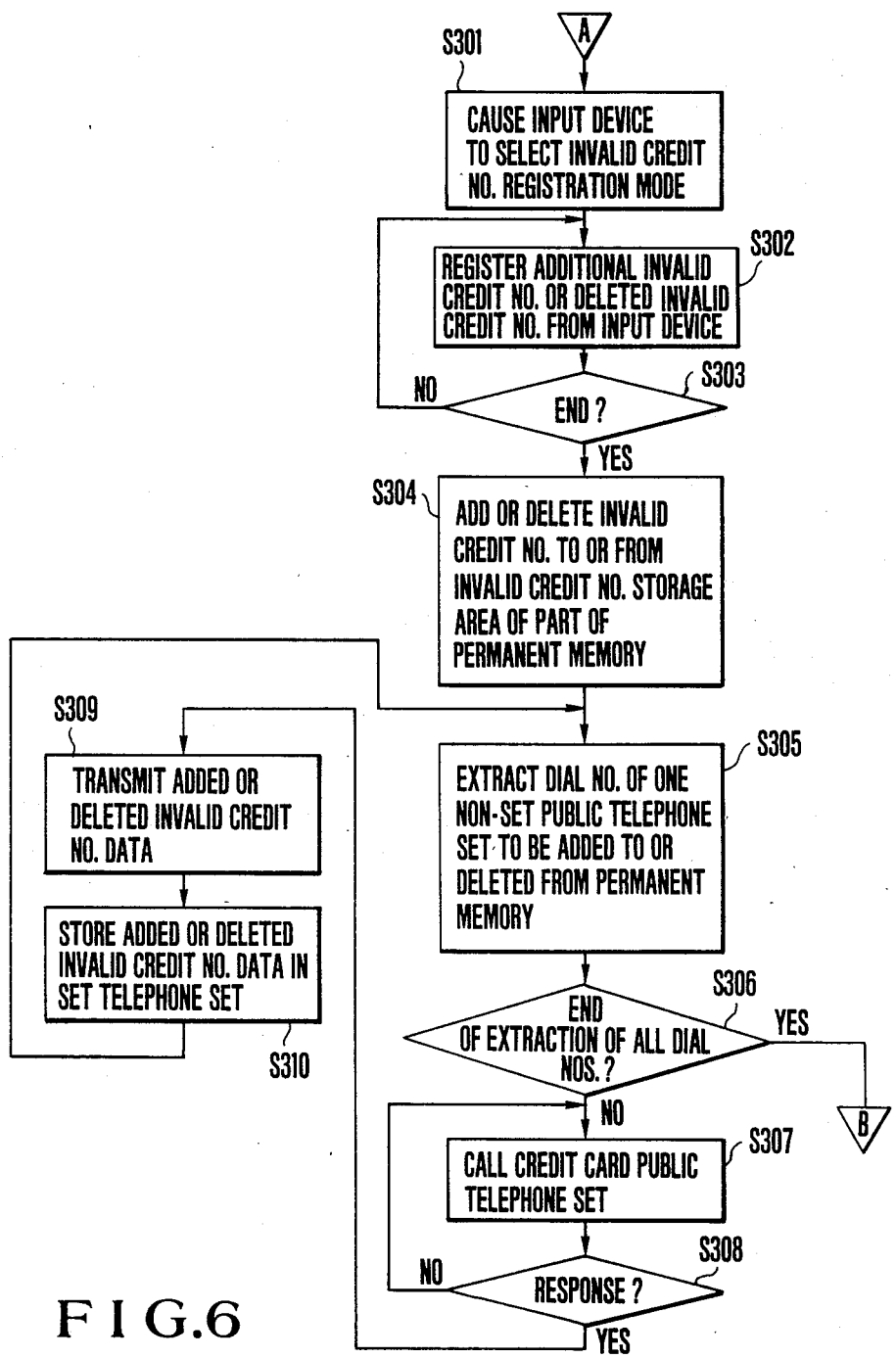
FIG. 6 is a flow chart showing an addition or deletion of invalid credit information in the centralized management system.

FIG. 6 is a flow chart showing an operation for designating an addition or deletion of an invalid credit No. in the centralized management apparatus. The operation will be described with reference to FIG. 6.

In a speech data reception waiting state represented by symbol A, a mode for registering invalid credit Nos. is selected through the input device (e.g., a keyboard) 55 (step S301). Invalid credit Nos. to be added or deleted are registered from the input device 55 (step S302). Upon completion of this registration (step S303), the invalid credit Nos. are added to or deleted from the invalid credit No. storage area (step S304). A dial number of one non-set public telephone set to be added or deleted is extracted from the permanent memory 54 (step S305). Thereafter, the controller 53 determines whether all public telephone sets are extracted (step S306). If NO in step S306, i.e., if all the telephone sets are not extracted yet, the remaining telephone sets are further accessed (step S307). When extraction of all the telephone sets is completed, a speech data reception waiting state represented by symbol B is set. When the called telephone set responds (step S308), the invalid credit No. data to be added or deleted are transmitted (step S309). The data of the set public telephone sets are stored in the controller 53 (i.e., its internal memory) (step S310), and the flow returns to step S305.

In the above embodiment, the speech data are output to the centralized management apparatus when the maximum memory capacity of the call count memory area in the public telephone set is full. However, the center may periodically perform polling of the public telephone sets and may cause each telephone set to output speech data.

As an application of this embodiment, if the telephone sets can communicate with the credit company through an on-line network, the system can be expanded to be compatible with the on-line network by satisfying only interface conditions suitable for the on-line network in the centralized management apparatus. In addition, in a credit card public telephone set, if failure information can be transmitted, centralized management of maintenance can also be achieved.

In various types of public telephone sets such as a coin public telephone set and a magnetic card public telephone set, if utilization conditions of calls and failure data can be transmitted in accordance with a similar signal transmission/reception sequence, all public telephone sets within a predetermined area can be managed by the centralized management apparatus.

According to the present invention, when the number of speech data (metering time and amount) reaches a predetermined value, the speech data are sent to the centralized management apparatus, and the speech data of each credit card are totalized every predetermined period of time. The speech data in units of calls can be totalized, e.g., every month, and therefore the speech data can be sent to the centralized management apparatus by low-cost charging usage. For this reason, even if a leased on-line network is not created, a public telephone set capable of accepting a credit card can be introduced by using the conventional public telephone line.

Since the invalid credit card data can be added to or deleted from each public telephone set, the center need not be accessed every call, unlike in the conventional public telephone set, thereby offering better service to users.

Since bills can be automatically issued to credit card holders, handling procedures in the credit companies and the public telephone companies can be reduced.

What is claimed is:

1. A public telephone set comprising:
   card control means for reading information recorded in a card and performing conveyance and data processing of said card on the basis of read information; and
   speech control means for performing speech control on the basis of data from said card control means; characterized in that said card control means comprises:
   a card guide port, connected to a first convey path, for receiving plural types of cards and dispensing only a specific type of card;

a return port, connected to a second convey path, for dispensing only remaining types of cards which are not dispensed to said card guide port; and card selecting means for switching said cards into said first and second convey paths on the basis of a property inherent to the types of cards inserted into said card guide port;

whereby charging processing corresponding to different types of cards is performed.

2. A telephone set according to claim 1, further comprising memory means for storing metering parameters associated with speech.

3. A telephone set according to claim 1, wherein said cards are a card in which information of a prepaid value is recorded, and a credit card.

4. A telephone set according to claim 1, wherein said inherent property is at least one property selected from the group consisting of a card thickness, an elastic force generated by the card thickness, information recorded in the card, and a card material.

5. A telephone set according to claim 2, wherein said metering parameters are a memory capacity of a call count memory and an arbitrarily predetermined time.

6. A telephone set according to claim 2, further comprising data output means for outputting speech data to an external centralized management apparatus when said metering parameters reach predetermined values.

7. A telephone set according to claim 6, wherein said speech data are a credit number, call data and time, a call start time, and a callee's telephone number.

8. A telephone set according to claim 6, wherein said external centralized management apparatus stores speech data sent from a plurality of public telephone sets including said public telephone set and totalizes the speech data in units of items every predetermined period of time.

9. A telephone set according to claim 6, wherein said centralized management apparatus comprises means for automatically issuing a bill to a credit card holder.

10. A telephone set according to claim 1, further comprising another control means for performing predetermined processing of invalid credit card data when the invalid credit card data is received from an external centralized management apparatus.

* * * * *

UNITED STATES PATENT AND TRADEMARK OFFICE
CERTIFICATE OF CORRECTION

PATENT NO. : 4,907,257
DATED : March 6, 1990
INVENTOR(S) : Asano et al

It is certified that error appears in the above-identified patent and that said Letters Patent is hereby corrected as shown below:

Column 1, line 16, after "credit" insert ---- card; ----.

Column 3, line 56, delete "to/-" and insert ---- to/ ----.

Column 3, line 63, delete "45,detects" and insert ---- 15, detects ----.

Signed and Sealed this

Seventeenth Day of March, 1992

Attest:

HARRY F. MANBECK, JR.

*Attesting Officer*     *Commissioner of Patents and Trademarks*